United States Patent [19]

Chi

[11] Patent Number: 5,201,242

[45] Date of Patent: Apr. 13, 1993

[54] COUPLING FOR SUPPORTING A FRONT FORK IN THE HEAD TUBE OF A BICYCLE

[76] Inventor: Yi C. Chi, No. 139-5, An Mei Rd., Mei Shan Village, Hou Li Hsiang, Taichung Hsien, Taiwan

[21] Appl. No.: 873,114

[22] Filed: Apr. 24, 1992

[51] Int. Cl.$^5$ .......................................... B62K 21/12
[52] U.S. Cl. .................................... 74/551.1; 403/370
[58] Field of Search ................ 74/551.1, 551.2, 551.3, 74/551.4, 551.5; 403/191, 370

[56] References Cited

U.S. PATENT DOCUMENTS

| | | | |
|---|---|---|---|
| 4,068,858 | 1/1978 | Harrison et al. | 74/551.1 X |
| 4,095,911 | 6/1978 | Lacroix | 74/551.1 X |
| 4,274,301 | 6/1981 | Katayama | 403/370 X |
| 4,501,435 | 2/1985 | McMurtrey | 74/551.1 X |
| 4,537,525 | 8/1985 | McMurtrey | 74/551.1 X |
| 4,545,594 | 10/1985 | Cabeza | 403/370 X |
| 4,881,750 | 11/1989 | Hartmann | 188/269 X |
| 5,044,648 | 9/1991 | Knapp | 280/276 X |
| 5,095,770 | 3/1992 | Rader, III | 74/551.3 X |

Primary Examiner—Rodney H. Bonck
Assistant Examiner—Ryan W. Massey
Attorney, Agent, or Firm—Charles E. Baxley

[57] ABSTRACT

A coupling for supporting an extension of a front fork in a head tube of a bicycle includes a bowl engaged in an upper portion of the head tube and includes a tapered surface. A ring element engages between the tapered surface of the upper bowl and the extension. A barrel engages on the ring element and a disc engages on the barrel. A fixed device engages in the extension with a bolt between the disc and the fixing device for pressing the barrel downward in order to press the ring element in place.

6 Claims, 3 Drawing Sheets

COUPLING FOR SUPPORTING A FRONT FORK IN THE HEAD TUBE OF A BICYCLE

BACKGROUND OF THE INVENTION

1. Field of the Invention

The present invention relates to a coupling, and more particularly to a coupling for supporting a front fork in the head tube of a bicycle.

2. Description of the Prior Art

A typical arrangement for fixing a handle stem is disclosed in U.S. Pat. No. 4,274,301 to Katayama, filed Jun. 30, 1978, entitled "HANDLE STEM FIXING DEVICE FOR A BICYCLE". In this fixing device, an outer thread should be formed on the upper end of the front fork such that the top ball race, the top ball head cup and the nut can be threadedly engaged on the upper end of the front fork. Before the handle stem is engaged in the front fork, the ball race and the head cup should be threaded onto the front fork such that the handle stem can be fixed in place. It is inconvenient to thread the ball race and the head cup. In addition, if the handle stem is caused to rotate relative to the front fork when, for example, the bicycle falls down to the ground, it is difficult to adjust and to correct the relative position between the handle stem and the front fork, the handle stem and the front fork should be unthreaded such that the handle stem can be adjusted and fixed in the correct position.

The present invention has arisen to mitigate and/or obviate the afore-described disadvantages of the conventional handle stem fixing devices.

SUMMARY OF THE INVENTION

The primary objective of the present invention is to provide a coupling for supporting a front fork in the head tube of a bicycle, in which the head cup need not be threaded onto the front fork.

In accordance with one aspect of the invention, there is provided a coupling for supporting an extension of a front fork in a head tube of a bicycle comprising a lower bowl and an upper bowl engaged on a lower portion and an upper portion of the head tube of the bicycle respectively and engaged between the head tube and the extension of the front fork, the upper bowl including a tapered surface formed in an upper and inner portion thereof, a ring element engaged between the upper bowl and the extension of the front fork and engaged with the tapered surface of the upper bowl, a barrel on the extension of the front fork and including a lower portion engaged on an upper portion of the ring element and an upper portion extended upward beyond the extension of the front fork, a disc engaged on the upper portion of the barrel, a bolt engaged on the disc and extended into the extension of the front fork, a first cone engaged on the bolt and including a first slanted engaging surface formed on a lower portion thereof, a second cone threadedly engaged on the bolt and located below the first cone and including a second slanted engaging surface formed on an upper portion thereof for engagement with the first slanted engaging surface of the first cone, the first cone and the second cone being caused to move radially outwards of the extension of the front fork by an engagement between the slanted engaging surfaces when the second cone moves toward the first cone and when the bolt is rotated, whereby, the first cone and the second cone are fixed within the extension, and further rotation of the bolt causes the barrel to move downward in order to press the ring element in place.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
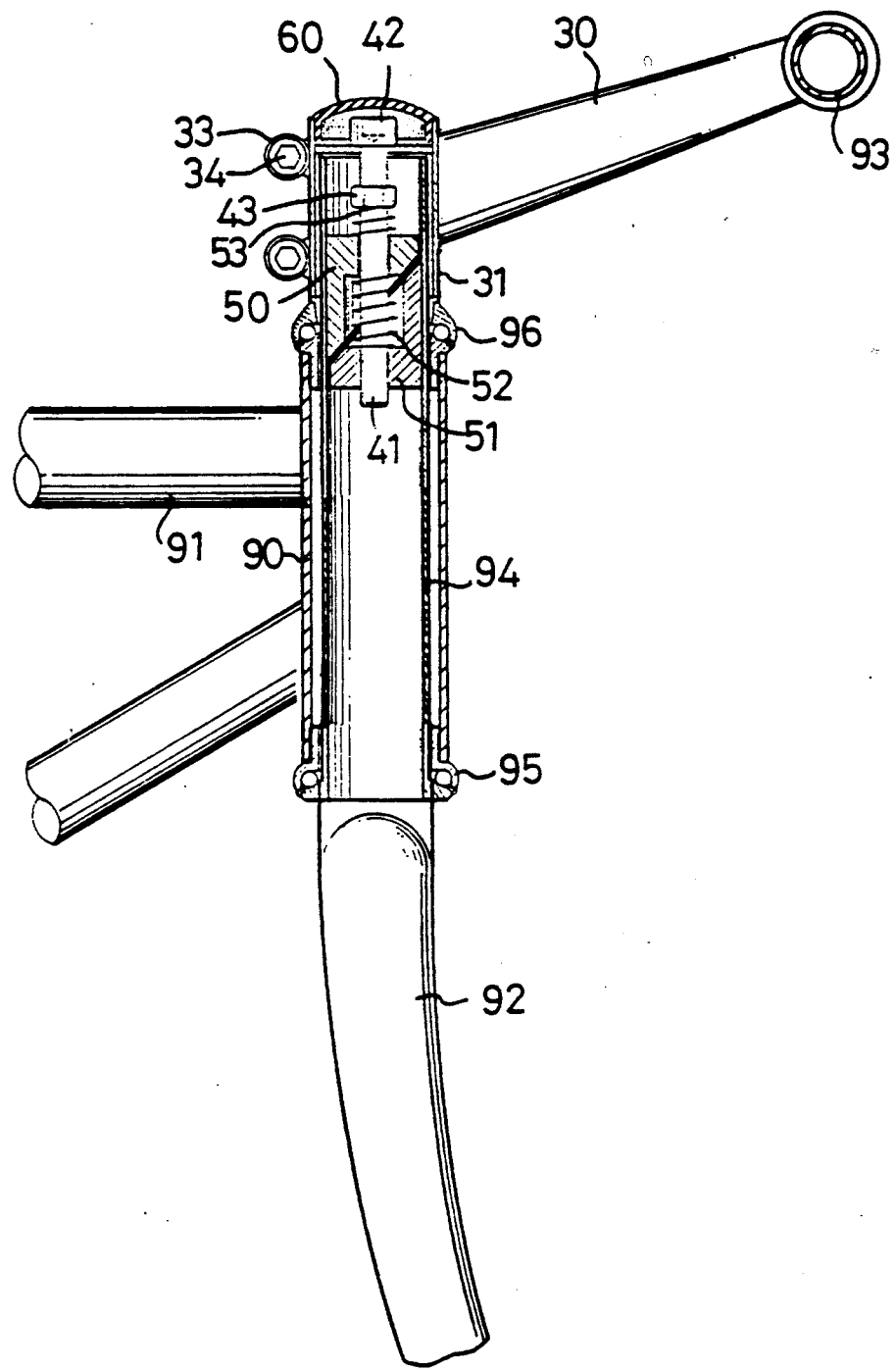
FIG. 1 is a perspective view of a coupling for supporting a front fork in the head tube of a bicycle in accordance with the present invention.

Referring to the drawings, and initially to FIG. 1, a coupling in accordance with the present invention is generally provided to couple the head tube 90 of a bicycle frame 91 and the extension 94 of the front fork 92 together, in which, the extension 94 extends upward from the front fork 92 and is engaged in the head tube 90 of the bicycle frame 91. It is to be noted that the upper end of the extension 94 of the front fork 92 need not be threaded neither inside nor outside. A lower bowl 95 and an upper bowl 96 are engaged on the lower portion and the upper portion of the head tube 90 respectively and engaged on the extension 94 of the front fork 92. The upper bowl 96 includes a tapered surface 97 formed in the upper and inner portion thereof.

Figure 2:
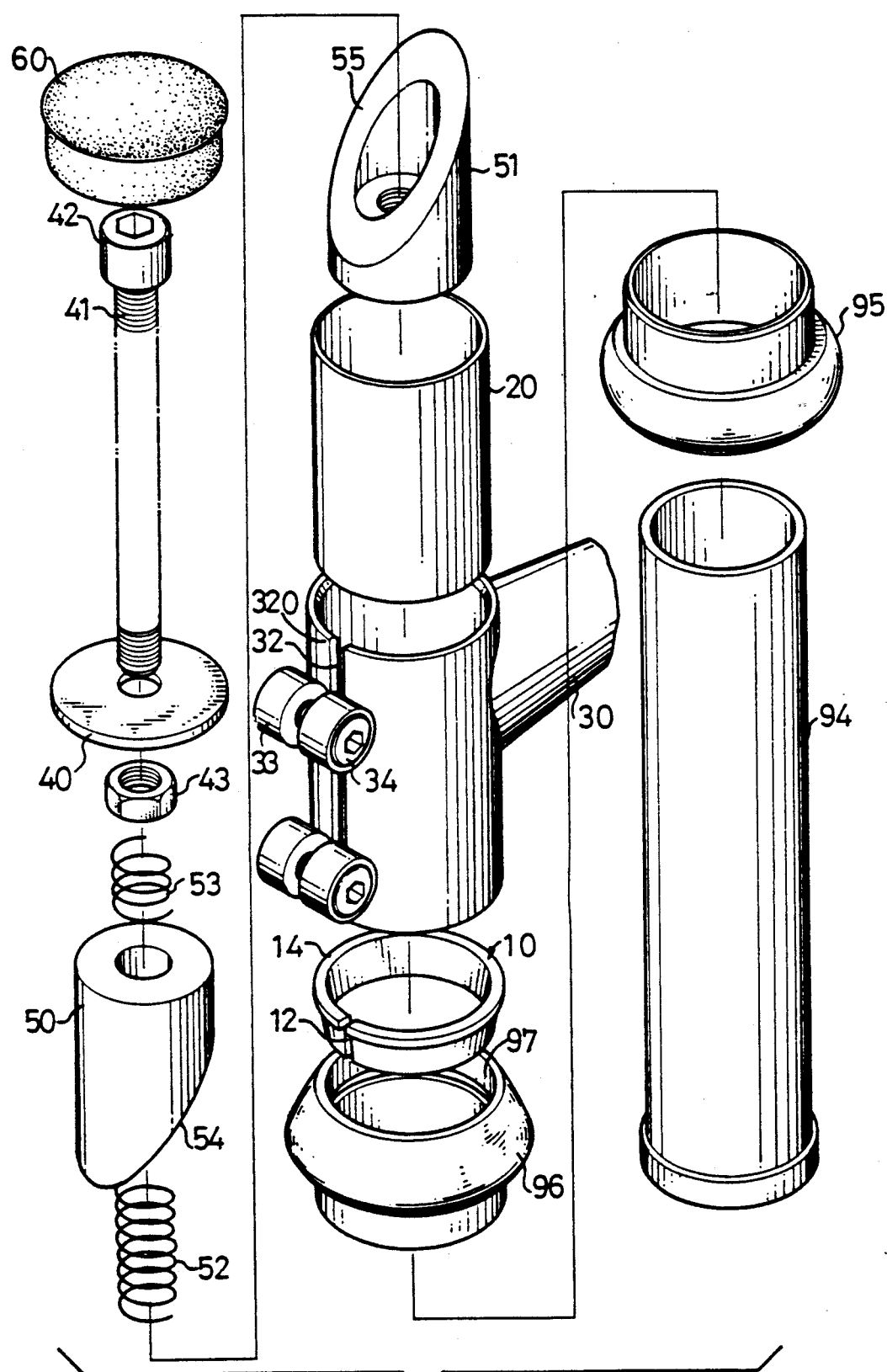
FIG. 2 is an exploded view of the coupling.
Figure 3:
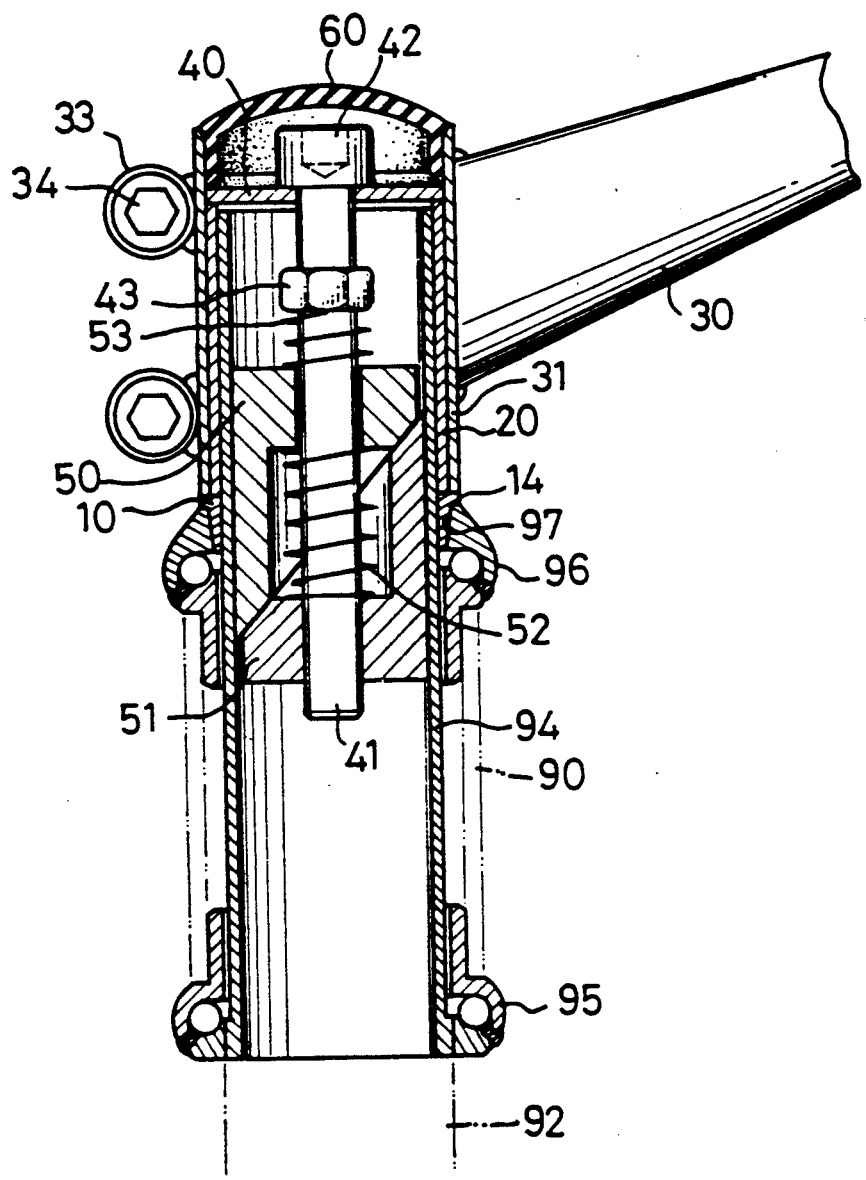
FIG. 3 is a cross sectional view of the coupling.

Referring next to FIGS. 2 and 3, and again to FIG. 1, the coupling comprises a ring element 10 engaged between the extension 94 of the front fork 92 and the upper bowl 96 and engaged with the tapered surface 97 of the upper bowl 96, in which the ring element 10 is preferably wedge-shaped and the engagement of the tapered surface 94 and the ring element 10 facilitates the engagement of the ring element 10 into the space formed between the extension 94 of the front fork 92 and the upper bowl 96. The ring element 10 includes a slit 12 formed therein and an annular flange 14 formed on the upper portion thereof in order to limit the downward movement of the ring element 10 relative to the upper bowl 96.

A barrel 20 is engaged on the upper portion of the extension 94 of the front fork 92 and engaged on the annular flange 14 of the ring element 10. A crank 30 for supporting the handlebar 93 of the bicycle is fixed to a sleeve 31 which is engaged on the barrel 20 and is also engaged on the annular flange 14 of the ring element 10. A split 32 is vertically formed in the sleeve 31 so that two abutting edges 320 are formed in the sleeve 31, two pairs of lugs 33 are formed on the sleeve 31 and are located on the abutting edges 320 of the sleeve 31 and can be coupled together by bolts 34 such that the abutting edges 320 of the sleeve 31 can be caused to move toward each other and such that the sleeve 31 can be fixed on the barrel 20.

A disc or washer 40 is engaged on the upper end of the barrel 20 which preferably extends upward beyond the upper end of the extension 94 of the front fork 92. A bolt 41 is extended in the extension 94 of the front fork 92 and includes a head 42 formed integral on the upper end thereof for engagement with the disc 40. A stop or a nut 43 is threadedly engaged on the upper portion of the bolt 41. A first cone 50 is engaged on the middle portion of the bolt 41 and a second cone 51 is threadedly engaged on the lower end portion of the bolt 41, a spring 52 is engaged between the cones 50 and 51, and another spring 53 is biased between the nut 43 and the first cone 50. The second cone 51 can be caused to move toward and away from the first cone 50 when the bolt 41 is rotated. The first cone 50 includes a first slanted engaging surface 54 formed in the lower portion and engaged with a second slanted engaging surface 55 which is formed in the upper portion of the second cone 51.

The engagement between the slanted engaging surfaces 54, 55 of the cones 50, 51 causes the cones 50, 51 to move radially outwards away from each other when the bolt 41 is rotated, such that the cones 50, 51 are caused to press against the inner surface of the extension 94 of the front fork 92, thereby fixing the cones 50, 51 within the extension 94. The first cone 50 will be caused to move slightly upward along the bolt 41 against the biasing force of the spring 53 when the second cone 51 moves upward along the bolt 41. It is to be noted that the strength or the biasing force of the spring 53 is no less than that of the spring 52 such that the spring 53 will not be fully compressed. Further rotation of the bolt 41, the disc 40 is caused to move downward such that the ring element 10 and the barrel 20 are caused to move downward, thereby stably fixing the bowls 95, 96 and the head tube 90 together. It is preferable that the sleeve 31 is fixed in place after the cones 50, 51 and the ring element 10 and the barrel 20 are fixed in place. A dust cap 60 is engaged on the upper end of the sleeve 31 in order to prevent dust and the like from entering into the sleeve 31 and the extension 94 of the front fork 92.

Alternatively, without the springs 52, 53, the first cone 50 may be stopped directly by the stop 43 and the second cone 51 contacts the first cone 50 without biasing by the spring 52, the second cone 51 can also be caused to move along the slanted engaging surfaces 54, 55 and the coupling for supporting the front fork in the head tube can be stably and solidly assembled and retained in place.

Further alternatively, without the stop 43, the first cone 50 may either be stopped by the disc 40 or be directly threaded on the bolt 41 such that the second cone 51 can also be caused to move along the slanted engaging surfaces 54, 55.

Accordingly, the front fork 92, 94 of the bicycle can be easily and stably retained in place in the head tube 90 of the bicycle. No threads are required to be formed on the extension 94 of the front fork 92 and the bowls 96, 97.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling for supporting an extension of a front fork in a head tube of a bicycle comprising a lower bowl and an upper bowl engaged on a lower portion and an upper portion of said head tube of said bicycle respectively and engaged between said head tube and said extension of said front fork, said upper bowl including a tapered surface formed in an upper and inner portion thereof, a ring element engaged between said upper bowl and said extension of said front fork and engaged with said tapered surface of said upper bowl, a barrel engaged on said extension of said front fork and including a lower portion engaged on an upper portion of said ring element and an upper portion extended upward beyond said extension of said front fork, a disc engaged on said upper portion of said barrel, a bolt engaged on said disc and extended into said extension of said front fork, a first cone engaged on said bolt and including a first slanted engaging surface formed on a lower portion thereof, a second cone threadedly engaged on said bolt and located below said first cone and including a second slanted engaging surface formed on an upper portion thereof for engagement with said first slanted engaging surface of said first cone, said first cone and said second cone being caused to move radially outwards of said extension of said front fork by an engagement between said slanted engaging surfaces when said second cone moves toward said first cone and when said bolt is rotated, whereby, said first cone and said second cone are fixed within said extension, and further rotation of said bolt causes said barrel to move downward in order to press said ring element in place.

2. A coupling according to claim 1 further comprising a stop threadedly engaged on said bolt and located above said first cone in order to limit an upward movement of said first cone.

3. A coupling according to claim 2 further comprising a first biasing means engaged between said stop and said first cone and a second biasing means engaged between said first cone and said second cone, whereby, said first cone and said second cone are caused to move away from each other by said second biasing means when said second cone is caused to move away from said first cone by rotation of said bolt.

4. A coupling according to claim 1 further comprising a sleeve engaged on said barrel for supporting a handlebar, said sleeve including a split vertically formed therein so that two abutting edges are formed in said sleeve, at least one pair of lugs formed on said sleeve and located on said abutting edges of said sleeve, said lugs being coupled together such that said abutting edges of said sleeve are caused to move toward each other and such that said sleeve is stably fixed on said barrel.

5. A coupling for supporting an extension of a front fork in a head tube of a bicycle comprising a lower bowl and an upper bowl engaged on a lower portion and an upper portion of said head tube of said bicycle respectively and engaged between said head tube and said extension of said front fork, said upper bowl including a tapered surface formed in an upper and inner portion thereof, a ring element engaged between said upper bowl and said extension of said front fork and engaged with said tapered surface of said upper bowl, a barrel engaged on said extension of said front fork and including a lower portion engaged on an upper portion of said ring element and an upper portion extended upward beyond said extension of said front fork, a disc engaged on said upper portion of said barrel, a bolt engaged on said disc and extended into said extension of said front fork, a first cone engaged on said bolt and including a first slanted engaging surface formed on a lower portion thereof, a second cone threadedly engaged on said bolt and located below said first cone and including a second slanted engaging surface formed on an upper portion thereof for engagement with said first slanted engaging surface of said first cone, said first cone and said second cone being caused to move radially outwards of said extension of said front fork by an engagement between said slanted engaging surfaces when said second cone moves toward said first cone and when said bolt is rotated, a stop engaged on said bolt and located above said first cone, a first biasing means engaged between said stop and said first cone, a second biasing means engaged between said first cone and said second cone, whereby, said first cone and said second cone are fixed within said extension, and further rotation of said bolt causes said barrel to move downward in order to press said ring element in place.

6. A coupling according to claim 5 further comprising a sleeve engaged on said barrel for supporting a handlebar, said sleeve including a split vertically formed therein so that two abutting edges are formed in said sleeve, at least one pair of lugs formed on said sleeve and located on said abutting edges of said sleeve, said lugs being coupled together such that said abutting edges of said sleeve are caused to move toward each other and such that said sleeve is stably fixed on said barrel.

* * * * *